UNITED STATES PATENT OFFICE.

STEPHEN L. GOODALE, OF SACO, MAINE, ASSIGNOR TO ALFRED M. GOODALE, OF WALTHAM, MASSACHUSETTS, AND MARCIA W. A. SPRING, OF PORTLAND, MAINE, TRUSTEES.

METHOD OF TREATING HYDRATED PHOSPHATES OF ALUMINA.

SPECIFICATION forming part of Letters Patent No. 493,889, dated March 21, 1893.

Application filed February 21, 1889. Serial No. 300,754. (No specimens.)

*To all whom it may concern:*

Be it known that I, STEPHEN L. GOODALE, a citizen of the United States, and a resident of Saco, in the county of York and State of Maine, have invented or discovered a certain new and useful art of and improvement in treating hydrated phosphates of alumina or of iron or both for the purpose of converting them into fertilizer or plant food of improved properties and increased value; and I do hereby declare that the following is a full, clear, and exact description of the invention, which will enable others skilled in the art to which it appertains to make and use the same.

My discovery and invention relate to manufacturing a plant food or concentrated fertilizer, from insoluble hydrated phosphates of alumina and of iron, whose large contents of phosphoric acid, essential to plant growth, become accessible to plants in nature only as slowly disintegrated by "weathering." My discovery is, broadly, that heat alone can be so applied as to produce such a change in these phosphates as to render them readily citrate soluble commonly called available and assimilable by plants; and that to reach this result, heat must be sufficient to expel the combined water, and must not be so great as to disturb the organization or constitution thus brought about. The product thus reached is a different fertilizer from previous products (because free from dilution or adulteration by chemicals as occurs under other processes) and is a better fertilizer because furnishing more available phosphoric acid, and is a cheaper fertilizer to manufacture and to transport.

My invention—based upon my said discoveries—consists in a process or method of rendering these phosphates available as fertilizers.

The scope and practice of my discovery and invention will be more readily understood by reference to the state of the art of manufacturing such plant food. It is well known that plants absorb phosphoric acid from the soil and grow thereby, and the value of fertilizer from these phosphates depends upon their large amount of phosphoric acid being rendered readily assimilable by plants. Hitherto these crude phosphates have been rendered fit for plant food only by aid of some second substance. The sulphuric acid process for manufacturing fertilizer from phosphates of lime can not be used with these phosphates. But treatment with other chemicals—muriatic acid, caustic lime, soda and potash sulphates and other re-agents—or mechanical mixing with less active substances, have been practiced. Practically, however, all these processes have been but partially successful, involving dilution, or excessive cost, and only occasionally and accidentally rendering the maximum of phosphoric acid available.

Under my discovery and invention, I do not only render more phosphoric acid available and more speedily so, but I do it without the expense or the aid of any second material, and I obtain a different, a cheaper, and a better plant food. I have been led by a long course of experiments to my discovery which is two-fold; first that plants can readily and rapidly assimilate or convert the phosphoric acid of these phosphates from their residuum alone just as it is left after elimination by heat of the water of constitution; and secondly that such residuum can be obtained by properly applying only such definite amount of heat as not to develop unfavorably molecular re-arrangement, or, if this can not be considered a demonstrable statement, as not to impair this condition of solubility; inasmuch as heat in proportion as it goes beyond the requisite amount, is sooner or later destructive of the desired solubility and assimilability of the residue.

My process of manufacturing this plant food or fertilizer based upon the foregoing discoveries will be seen to be not only simple and certain, but distinct from prior processes whether successful or unsuccessful. None of the steps, in and of themselves which I take with the crude material, are novel, although they are entirely so as to the rules by which they are taken, and as applied to this subject matter, and for this purpose. For instance, it has long been known that in determining chemical constituents by analysis; water or other volatile elements may be eliminated by means of heat, as is sometimes expressed by the word "calcining." But my process consists essentially in so applying heat and limiting its amount that while the combined water shall be entirely expelled no injury shall be done to the residue by excess of heat, whereby its solubility is impaired. My manufacturing process then is comparatively simple. There must be a suitable heating receptacle for the raw material, having a vapor outlet. It must be so constructed that the heat will be admitted and distributed uniformly. Ordinary methods of controlling the heat will be found necessary. Heat must not be applied directly, as by an incandescent material or flame coming in contact with the phosphate. The heat must be applied within limits which, although somewhat variable, are quite determinable. This variability arises mainly from three sources, first, differing proportions of iron or alumina in different samples of the phosphates; second varying degrees of hydration ranging from sixteen per cent. (or occasionally below) to twenty-five per cent. (or occasionally above); and third, the presence of accidental or indifferent matters containing no combined water. Tests in a small way may determine this for given lots.

In most cases the proper effect of the heat will be secured at about 325° centigrade. I more exactly determine the necessary amount of heat in any given case by exposing from time to time, as the heat approaches 275° centigrade, a metallic or other proper cold surface to the orifice where escaping invisible vapor, can be recognized by being deposited on the cold surface as dew, and when this deposit ceases further increase of heat must be arrested lest the condition of solubility be destroyed. So far as this is a variable rule, it is at the same time definite, inasmuch as although it describes no absolute fixed temperature, it yet contemplates variation in the rule only as the crude samples vary. Heat to the requisite amount having been thus applied its further increase is arrested. If large quantities are to be treated at one operation great care should be given in regard to continuance and especially to increase of heat near the end, in order to avoid over-passing the proper limit. This is especially needful for an operator before he has acquired sufficient practical familiarity with the manipulation appropriate to phosphates, and which should allow for the continuance of heat after the drafts have been closed. These rules will be found complete, satisfactory and successful; although there may be variations in the raw material other than what I have noticed. In my experience the water of constitution in different samples varies, as I have intimated; about 275° centigrade has appeared to be the maximum of heat for the least hydrated samples, and from that to 325° centigrade for samples having the maximum water of constitution.

Having thus explained my discoveries and described the way in which they are to be applied in the new process by means of heat alone by which means for the first time not only has a fertilizer or plant food but a different and better one been obtained from these phosphates, I should not wish to be understood as claiming broadly the chemical procedure which chemists have for many years termed dehydration, nor of course the process of calcining without reference to specific subject matter and under specific rules, but What I do desire to protect by Letters Patent and claim is—

The new art or process of rendering insoluble hydrated phosphates of alumina and of iron easily soluble and so available as rapidly as plant fertilizers, which consists in heating these phosphates, in suitable receptacles, by the indirect application of heat, until all the water of constitution is expelled, or usually, until heat has been applied sufficient to raise the temperature of the mass to about 325° centigrade, and then arresting the heat and allowing the resulting product to cool spontaneously, substantially as and for the purpose described.

In testimony whereof I have hereunto subscribed my name this 20th day of February, A. D. 1889.

STEPHEN L. GOODALE.

Witnesses:
JOHN H. TAYLOR,
ELLEN B. TOMLINSON